Patented May 25, 1926.

UNITED STATES PATENT OFFICE.

OTTO DENGLER, OF TUTZING NEAR MUNICH, GERMANY, ASSIGNOR TO THE FIRM C. H. BOEHRINGER SOHN, CHEMISCHE FABRIK NIEDER-INGELHEIM A. RHEIN, OF NIEDER-INGELHEIM-ON-THE-RHINE, GERMANY, A CORPORATION OF GERMANY.

PROCESS FOR THE PRODUCTION OF PURE LECITHIN.

No Drawing.  Application filed May 11, 1925. Serial No. 29,619.

The object of this invention refers to a process for the production of pure lecithin.

The new process mainly consists in forming the lecithin into its compounds with cholic acid salts. The double compounds thus formed, consisting e. g. of the potassium salt or the sodium salt of the lecithin cholic acid, are treated with a suitable solvent for abstracting impurities, such as fat, cholesterin and the like, from the reaction mixture containing the formed compounds while the lecithin is combined with the cholic acid salt and may be obtained from the combination in question, after the salt has been purified.

In carrying out the invention one may proceed e. g. in such a way that the lecithin to be purified is first converted into crystallized compounds with cholic acid salts. This may be effected e. g. by grinding the components with each other, while adding small quantities of solvents e. g. alcohol, ether and the like. The double compounds may also be produced from suitable concentrated solutions of the components by means of appropriate precipitants or by concentrating the solutions. Furthermore the lecithin may first be introduced through a proper treatment with cholic acids into combinations with the latter whereupon these are converted, by the reaction of alkali metal hydroxide, into combinations of the lecithin with alkaline salts of cholic acids.

The pure crystallized double compounds are treated with solvents for fat and cholesterin, e. g. with ether, benzol, etc. through which the impurities are absorbed, while the lecithin is retained by the cholic acid salt and thus protected from any action of the solvent. The double compound freed from fat and cholesterin is decomposed by suitable means for instance by adding a great excess of mineral acid e. g. diluted hydrochloric acid. If the presence of appropriate solvents for lecithin, e. g. ether, benzol and the like, is provided for at the same time, the lecithin set free passes into these solvents, whereas the cholic acid is left behind in an undissolved condition. By evaporating the solvent there will at least be obtained, in a simple way, a lecithin of quite a particular degree of fineness.

Instead of isolating the compounds of lecithin and cholic acid salts in a crystallized form, the water solutions of the same may as well be worked up forthwith in accordance with the invention.

In the course of this process it has been discovered that cholic acid salts in a water solution can absorb by far more lecithin than the crystallized compounds and that, on this condition, they are likewise able to retain the lecithin, protecting it from solvents such as ether, benzol and the like.

Therefore the invention may also be carried out in such a manner that a water solution of cholic acid salts is saturated with lecithin, whereupon solvents for fat and cholesterin are made to react on this solution for the purpose of abstracting its impurities. After this the decomposition of the double compound and the separation of the pure lecithin may take place as explained above.

Moreover it has been observed that from saturated water solutions of this kind containing e. g. 2 parts of lecithin to one part of sodium cholate, solid products may be obtained by evaporating them cautiously, and that in this form, the products are no more insusceptible of solvents for lecithin On this account the production of lecithin may also be achieved by removing the fat and the cholesterin from the saturated solutions and by then evaporating the latter until they are dried up, the residue being ground with ether, benzol or the like. In this way one will bring about the decomposition into lecithin, which is absorbed by the solvent, and into the remaining crystallized combination of lecithin with cholic acid salts, which may undergo a further decomposition according to the aforesaid instructions, and may be worked up into lecithin.

*Examples.*

(1.) 100 g. of sodium cholate are dissolved in 100 ccm. of water and stirred with 20 gr. of lecithin until dissolved, whereupon 100 ccm. of alcohol and then ether are added, until a turbid state is reached. Through another careful addition of ether nearly the total quantity of the double compound will at last be obtained in the shape of long, fine crystallized strips or needles. The latter must be continuously treated with ether.

These are then dissolved in water; this water solution is spread over with ether, whereupon about the tenfold amount of 10 per cent hydrochloric acid is added. After shaking up the mixture, the removed ether is purified with a very diluted soda mixture (¼% soda solution) for the purpose of separating the acid, and hereupon it is evaporated.

(2.) 100 g. of a watery solution containing 50% of cholic acid sodium salt are ground with 100 g. of lecithin, until a homogeneous liquid has been formed. Thereupon the impurities are abstracted by shaking up, preferably several times, with ether or benzol, after which the water solution is evaporated in a vacuum. The solid residue is treated with ether for extracting the lecithin, then it is filtered after standing a short while, and at last the etheral solution is evaporated.

(3.) 200 g. of a watery solution of 50% desoxycholic acid potassium salt are stirred up with 250 g. of lecithin until a homogeneous liquid is formed. Thereupon one must shake up twice with benzol, then mix the water solution remaining after this, while cooling down, with 500 g. of 10% hydrochloric acid and stir with ether at the same time. For the purpose of separating the last traces of acid, the removed ether is shaken up with a highly diluted soda solution and then evaporated.

Wherever, in this description as well as in the claims, mention has been made of cholic acid salts, not only alkaline cholates are referred to, but also e. g. alkali desoxycholates, glycocholic acid alkali salts, apocholic acid alkali salts and other compounds of alkaline metals with cholic acids.

The beforementioned compounds correspond to the following acids:

Cholic acid: $C_{24}H_{40}O_5$; desoxycholic acid: $C_{24}H_{40}O_4$; apocholic acid: $C_{24}H_{38}O_4$; glycocholic acid: $C_{26}H_{45}O_7N$.

Claims:

1. Process for the production of pure lecithin, comprising combining lecithin containing impurities with cholic acid salts, freeing the latter from the impurities by means of solvents, and separating the lecithin again from the purified compounds.

2. Process for the production of pure lecithin, consisting in treating lecithin, containing impurities with cholic acid salts to produce crystallized compounds, removing the impurities from the reaction mixture by means of solvents, and reproducing the lecithin from the said purified compounds.

3. Process for the production of pure lecithin, comprising converting lecithin, containing cholesterin and fats, into mixtures with cholic acid salts, freeing the latter from their impurities by means of solvents, and in separating the lecithin again from the purified compounds.

4. Process for the production of pure lecithin, comprising intimately mixing lecithin, containing impurities, and cholic acid salts, while adding small quantities of solvents, and thus forming the components into the form of crystallized double compounds, freeing the latter from the impurities by means of solvents, and reproducing the lecithin from the purified double compounds.

5. Process for the production of pure lecithin, comprising introducing lecithin, containing cholesterin and fats, into combinations with cholic acids, freeing the latter from these substances through means of solvents for fat and cholesterin, and in reproducing the lecithin from the purified compounds.

6. Process for the production of pure lecithin, comprising introducing the lecithin containing impurities into combinations with cholic acids, freeing the latter from the impurities, and treating the purified compounds with an excess of mineral acids to decompose said purified compounds into cholic acids and lecithin.

7. Process for the production of pure lecithin, comprising introducing lecithin, containing impurities, into compounds with cholic acid salts, in abstracting the impurities from the latter, decomposing the purified combinations by treating them with mineral acids in excess, and separating the liberated lecithin from the cholic acids by solvents in which cholic acids are not soluble.

8. Process for the production of pure lecithin, comprising introducing lecithin, containing impurities into combination with cholic acid salts to the form of water solutions, freeing the latter from the impurities by means of solvents, and in reproducing the lecithin from the purified solutions.

9. Process for the production of pure lecithin, comprising treating lecithin, containing fats and cholesterin with cholic acid salts in the form of water solutions to form compounds, freeing the latter from said fats and cholesterin through means dissolving the latter, and separating the lecithin again from the purified solutions.

10. Process for the production of pure lecithin, comprising converting lecithin containing fats and cholesterin by treatment with a water solution of cholic acid salts to form double compounds, freeing the said compounds from fat and cholesterin by means of solvents, and in obtaining the lecithin from the purified double compounds by treating them with mineral acids in excess and removing the lecithin by a solvent in which cholic acids are insoluble.

11. Process for the production of pure lecithin, comprising treating lecithin, containing impurities with water solutions of cholic acid salts, saturating the latter with lecithin, removing the impurities from the saturated solutions by means of solvents, and separating the lecithin from the purified solutions.

12. Process for the production of pure lecithin, comprising treating lecithin, containing fat and cholesterin to form saturated water solutions of compounds of lecithin and cholic acid salts, freeing the saturated solutions from the fats and cholesterin by treatment with solvents for the fats and cholesterin, and separating the lecithin from the purified solutions.

13. Process for the production of pure lecithin, comprising converting lecithin containing impurities with cholic acid salts by treating said lecithin with saturated water solutions of said salts, freeing the mixture from the impurities by means of solvents, evaporating the water solutions to dryness, and liberating the lecithin from the residue by means of solvents.

14. Process for the production of pure lecithin, comprising converting lecithin containing impurities into compounds with cholic acid salts by treating the lecithin with saturated water solutions of said salts, freeing the said compounds from the impurities by treatment of solvents, evaporating the water solutions to dryness, liberating the lecithin from the residue by solvents for said lecithin, and in decomposing the remaining compounds of lecithin into their components by treatment with cholic acid salts.

In testimony whereof I affix my signature.

Dr. OTTO DENGLER.